US009208440B2

(12) United States Patent
Morara et al.

(10) Patent No.: US 9,208,440 B2
(45) Date of Patent: Dec. 8, 2015

(54) METHOD OF ANALYZING A SCENARIO REPRESENTED AS ELEMENTS OF A TENSOR SPACE, AND SCORED USING TENSOR OPERATORS

(71) Applicant: Battelle Memorial Institute, Columbus, OH (US)

(72) Inventors: Michele Morara, Miami, FL (US); Mark D. Davis, Sunbury, OH (US); Steve W. Rust, Worthington, OH (US)

(73) Assignee: Battelle Memorial Institute, Columbus, OH (US)

( * ) Notice: Subject to any disclaimer, the term of this patent is extended or adjusted under 35 U.S.C. 154(b) by 267 days.

(21) Appl. No.: 13/904,456

(22) Filed: May 29, 2013

(65) Prior Publication Data

US 2013/0325784 A1    Dec. 5, 2013

Related U.S. Application Data

(60) Provisional application No. 61/652,703, filed on May 29, 2012.

(51) Int. Cl.
*G06N 5/02* (2006.01)
*G06Q 50/26* (2012.01)

(52) U.S. Cl.
CPC .................. *G06N 5/02* (2013.01); *G06Q 50/26* (2013.01); *G06Q 50/265* (2013.01)

(58) Field of Classification Search
None
See application file for complete search history.

(56) References Cited

U.S. PATENT DOCUMENTS

| 7,225,122 | B2 | 5/2007 | Shaw | |
|---|---|---|---|---|
| 2006/0184483 | A1* | 8/2006 | Clark et al. | 706/45 |
| 2007/0061758 | A1 | 3/2007 | Manson et al. | |
| 2007/0239643 | A1* | 10/2007 | Liu et al. | 706/29 |
| 2008/0319947 | A1* | 12/2008 | Latzina et al. | 707/3 |
| 2013/0138586 | A1* | 5/2013 | Jung et al. | 706/12 |

OTHER PUBLICATIONS

Franz et al, TripleRank: Ranking Semantic Web Data by Tensor Decomposition, 2009.*
Lee et al, Document Ranking and the Vector-Space Model, 1997.*
Saha et al, Classification of Web Services Using Tensor Space Model and Rough Ensemble Classifier, 2008.*
Turney et al, From Frequency to Meaning: Vector Space Models of Semantics, 2010.*
Alspaugh, "*Temporally Expressive Scenarios in ScenarioML*," ISR Technical Report, May 2005.
Leite et al, "*A Scenario Construction Process*" Requirements Engineering, vol. 5, pp. 38-61, 2000.

* cited by examiner

*Primary Examiner* — Jeffrey A Gaffin
*Assistant Examiner* — Mikayla Chubb
(74) *Attorney, Agent, or Firm* — Diederiks & Whitelaw, PLC (57) ABSTRACT

A mathematical model to represent multiple role events of a threat scenario, and a methodology to score the events given the data or evidence contained in a knowledge base is provided. The multiple role event can include any action encompassed by an independent clause having multiple syntactical roles (subject, object, location, etc. . . . ) and containing multiple entities (person A, person B, object C, place D, etc. . . . ). Multiple role events are represented as elements of a tensor space, and are scored using tensor operators built from the semantic graph associated with the knowledge base.

18 Claims, 6 Drawing Sheets

|  | Mario | Giuseppe | Foods | UniDrive | FloydAve | Phone |
|---|---|---|---|---|---|---|
| Mario | . | . | 1 | 2 | 1 | 1 |
| Giuseppe | . | . | . | 1 | . | . |
| Foods | 1 | . | . | . | . | . |
| UniDrive | 2 | 1 | . | . | . | . |
| FloydAve | 1 | . | . | . | . | . |
| Phone | 1 | . | . | . | . | . |

Columns labeled 61 (Mario), 62 (Giuseppe), 63 (Foods), 64 (UniDrive), 65 (FloydAve), 66 (Phone). Matrix A.

FIG. 4

$$L = \begin{pmatrix} 5 & & & & & \\ & 1 & & & & \\ & & 1 & & & \\ & & & 3 & & \\ & & & & 2 & \\ & & & & & 2 \end{pmatrix} - \begin{pmatrix} . & . & 1 & 2 & 1 & 1 \\ . & . & . & 1 & . & . \\ 1 & . & . & . & . & . \\ 2 & 1 & . & . & . & . \\ 1 & . & . & . & . & 1 \\ 1 & . & . & . & 1 & . \end{pmatrix}$$

Left matrix labeled D, right matrix labeled A.

FIG. 5

$$V = \begin{Bmatrix} 0.17 & -0.17 & 0 & 0 & 0 & 0 \\ -0.17 & 1 & -0.33 & 0.17 & -0.33 & -0.33 \\ 0 & -0.33 & 0.83 & -0.17 & -0.17 & -0.17 \\ 0 & 0.17 & -0.17 & 0.33 & -0.17 & -0.17 \\ 0 & -0.33 & -0.17 & -0.17 & 0.5 & 0.17 \\ 0 & -0.33 & -0.17 & -0.17 & 0.17 & 0.5 \end{Bmatrix}$$

FIG. 6

$$R = \begin{Bmatrix} 0 & 1.5 & 1 & 0.5 & 0.67 & 0.67 \\ 1.5 & 0 & 2.5 & 1 & 2.17 & 2.17 \\ 1 & 2.5 & 0 & 1.5 & 1.67 & 1.67 \\ 0.5 & 1.0 & 1.5 & 0 & 1.17 & 1.17 \\ 0.67 & 2.17 & 1.67 & 1.17 & 0 & 0.67 \\ 0.67 & 2.17 & 1.67 & 1.17 & 0.67 & 0 \end{Bmatrix}$$

FIG. 7

$$C = \begin{Bmatrix} 0 & 0.67 & 1.0 & 2.0 & 1.5 & 1.5 \\ 0.67 & 0 & 0.4 & 1.0 & 0.46 & 0.46 \\ 1.0 & 0.4 & 0 & 0.67 & 0.6 & 0.6 \\ 2.0 & 1.0 & 0.67 & 0 & 0.86 & 0.86 \\ 1.5 & 0.46 & 0.6 & 0.86 & 0 & 1.5 \\ 1.5 & 0.46 & 0.6 & 0.86 & 1.5 & 0 \end{Bmatrix}$$

METHOD OF ANALYZING A SCENARIO REPRESENTED AS ELEMENTS OF A TENSOR SPACE, AND SCORED USING TENSOR OPERATORS

CROSS REFERENCE TO THE RELATED APPLICATION

The present application claims the benefit of U.S. Provisional Patent Application Ser. No. 61/652,703, filed on May 29, 2013, entitled "Method of Analyzing a Threat Scenario Represented as Elements of a Tensor Space, and Scored Using Tensor Operators," the contents of which are hereby incorporated by reference.

BACKGROUND OF THE INVENTION

The present invention pertains to the art of analyzing hypothetical scenarios that can be described by narrative text and, more particularly, to analyzing a hypothetical scenario based on a knowledge base of narrative text containing information describing evidence for various events that may be part of a hypothetical scenario and organizing the events and information in a format that may be statistically analyzed using mathematical tools. The mathematical tools include representing both the information contained in the knowledge base and the hypothetical scenarios in a tensor format allowing associating a bounded positive number, the score, to hypothetical scenarios given the evidence contained in the knowledge base.

Currently, several nations are facing threats from violent actions taken against them from foreign countries, international terrorists and/or internal organizations that resort to violent actions. In order to counteract or prevent these violent acts, organizations, such as government agencies and in some cases corporations, employ analysts to try to predict when such violent actions may occur.

Generally, the organizations start by collecting information about suspected groups. Such information may be gathered from several sources. For example, computer based communications, such as E-mails, may be intercepted and the contents or a summaries of the E-mails stored. Telephone intercepts may be translated and also stored, usually as narrative text. Other information may come from police reports describing the results of searches or people that have been arrested. In some cases, reports may come from military units that capture people or computers having information of interest. In each case, threat analysts usually express scenarios as narrative text using written language. Each entry will generally describe basic information about an event. Specifically, the entry often will include an entity who committed certain acts, what they did, when they did it, where the acts took place, etc. However, the entries and other evidence are often fragmentary and not organized in a meaningful way.

While such information may be useful directly and each narrative report may provide valuable information, often truly useful information needed to predict a violent action may only become apparent when information from various different sources is cross-referenced and analyzed together. Even then the task of figuring out if the information is directed to one or more distinct events is particularly difficult. Collecting and organizing information from a large number of sources and converting the information into a format that can be easily analyzed has proven to be a difficult task of interest in developing tools that predict the likelihood a certain event will or has occurred.

U.S. Pat. No. 7,225,122 proposes a method for analyzing computer communications to produce indications and warnings of dangerous behavior. The method includes collecting a computer-generated communication, such as an E-mail, and parsing the collected communication to identify categories of information that may be indicative of the author's state of mind. When the system identifies an author who represents a threat, then appropriate action may be taken. However, the method only focuses on electronic communications and determining the state of mind of an author. The method does not address any other predictors of when and where a violent event may occur. Also, the method does not organize the information in a format that may be statistically analyzed by mathematical tools. Instead, the method focuses on using Weintraub algorithms to profile psychological states of an author.

U.S. Patent Application Publication No. 2007/0061758 discloses a method for processing natural language so that text communications may be displayed as diagrammatic representations. This patent document does not address pulling information from different sources and organizing the information.

As can be seen from the above discussion, there exists a need in the art for a method providing a structural representation of a scenario that takes narrative text from various sources and produces a format that may be statistically analyzed with mathematical tools and more particularly to develop mathematical tools and algorithms that allow analysts to effectively anticipate events given fragmentary evidence stored in a knowledge base represented by a semantic graph and to assign a score or probability to each event to determine a probability of its occurrence.

SUMMARY OF THE INVENTION

The present invention is directed to a method for providing a scoring of events described in narrative text communications to rank the relative likelihood that a particular event will or has occurred given information in a knowledge base. The method includes collecting evidence as narrative text and store the evidence in a knowledge base as a list of triples "subject-relation-object". All the items in a knowledge base that are either subjects and/or objects are referred here as entities. A vector space X having a dimension equal to the number of entities in the knowledge base is defined by associating each basis vector with one, and only one, entity in the knowledge base. The relationships among the entities in the knowledge base, described by the subject-relation-attribute triples, are then represented by a weighted symmetric matrix A acting on the vector space, that is A: X→X. The events in a hypothetical scenario are represented as independent clauses, each of which has one, and only one, verb identifying the type of the event. Typically, in each event, an entity conducts an action that is described by the verb, e.g., "Mario Rossi lives at University Drive." A tensor space $H = X \otimes X \otimes \ldots \otimes X$ is built from vector space X, and used to represent the events of a hypothetical scenario as tensors. A tensor operator T: H→H, capturing the relationships among the entities of the knowledge base, is built from the adjacency matrix A: X→X, and used to score events. In one embodiment, scoring an event relatively to an event class (defined as a set of events containing the event being scored) includes defining a score as a tensor scalar product between the tensor describing the event and the tensor describing the event class, with a metric induced by the tensor operator. In another embodiment, scoring an event against itself includes calculating a scalar product of the event with itself, with a metric induced by the tensor operator.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
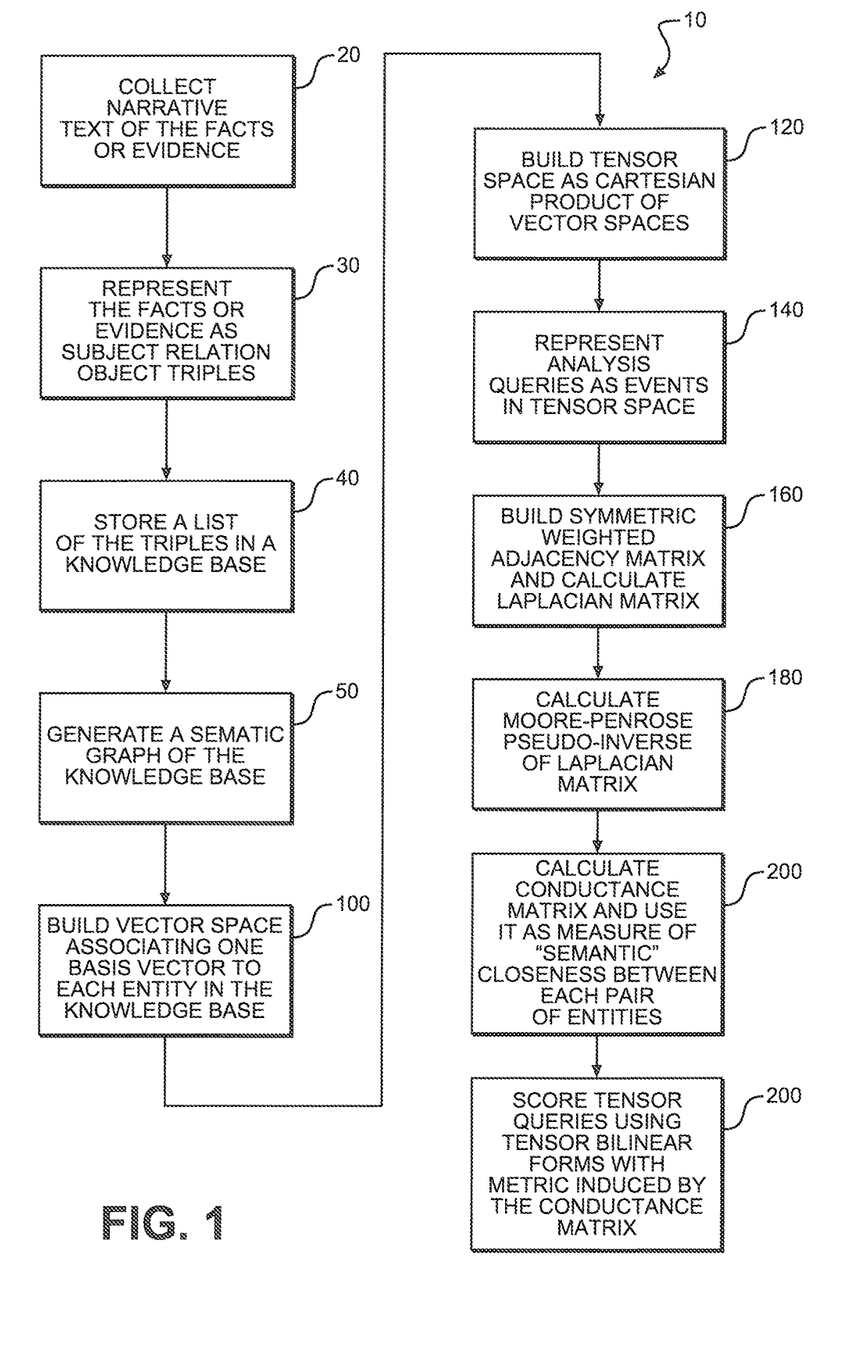
FIG. 1 is a flow chart showing a method of analyzing a scenario according to a preferred embodiment of the invention.

With initial reference to FIG. 1, there is shown a flow chart depicting a method 10 according to a preferred embodiment of the invention. In order to apply mathematical tools to perform statistical inference, such as ranking the relative likelihood that certain events in a threat scenario will occur given a certain set of evidence described by entries expressed by analysts as narrative text, the scenario must first be represented in a simplified organized manner as detailed below. A knowledge base is built to capture the evidence collected by analysts as narrative text. A syntactic model is established to represent the events in a hypothetical scenario. The syntactic model captures the literary meaning or denotation, but disregards the poetic suggestive meaning or connotation. Also, the model avoids the redundancy inherent in written language.

A first step 20 in method 10 is to collect narrative text reports containing information about any number of scenarios of interest. As noted above, such text reports may be gathered from several sources. For example, computer based communications, such as E-mails, may be intercepted and the contents or a summary of each E-mail may be stored. Telephone intercepts may be translated and also stored, usually as narrative text. Other information may come from police reports describing the results of searches or data on people that have been arrested. In some cases, reports may come from military units that capture people or computers having information of interest. Regardless of the source in each case, a narrative report is produced. This information is referred to as "facts" or "evidence."

The evidence, represented as narrative text, is then organized in a knowledge base in the form of a list of triples: "subject-relation-object". An ontology is developed to specify all the allowable types of triples in the knowledge base, and the narrative text is then organized into triples according to the ontology. The ontology and the list of triples constitute the knowledge base. The items represented as "subject" and/or "attribute" in the triples are referred to as "entities;" and to the items represented as "relation" in the triples as "relations." At step 30, the information or facts in the groups of words are represented as subject-relation objection triples, e.g., Mario Rossi lives at 2932 University Drive. At step 40, the triples are then aggregated to form a knowledge base.

Figure 2:
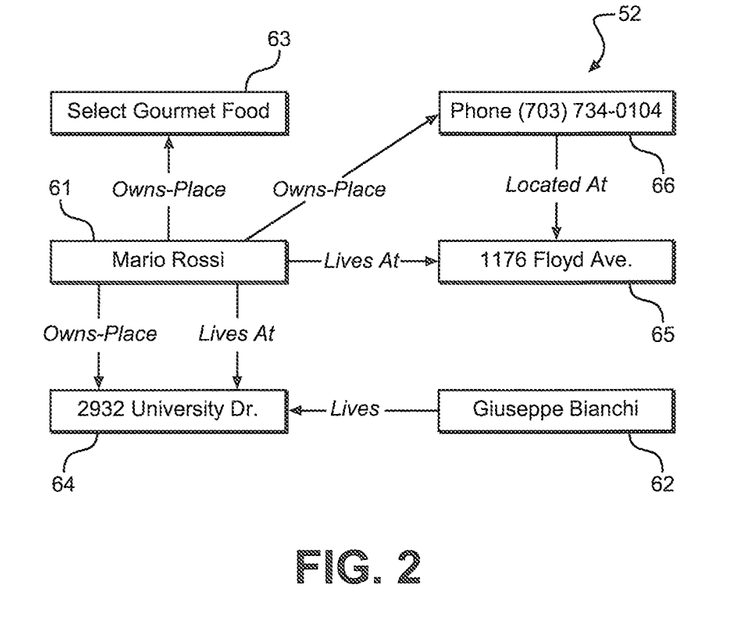
FIG. 2 shows an example of a knowledge base of people, places, objects and actions.

At step 50, a semantic graph of the knowledge base is generated. An example is shown in FIG. 2 which represents a semantic graph 52 of the knowledge base generated in step 40. Semantic graph 52 shows entities 61-66 arranged to show how entities 61-66 are related to one another. The text has been broken down into simple triplets including a subject, a predicate and an object. Essentially, the narrative text is coded into a mathematical format. FIG. 2 includes six entities 61-66 which can either be a subject or an object. In this case, semantic graph 52 shows Mario Rossi 61, Guiseppe Bianchi 62, Select Gourmet Food 63, 2932 University Drive 64, 1176 Floyd Avenue 65 and a phone number 66, i.e., (555) 555-####. Semantic graph 52 shows several triplets of subject, predicate and object. Semantic graph 52 is subject to not only mathematical analysis but is also readable by a human observer. By inspection, one can tell that Mario Rossi 61 owns Select Gourmet Food 63. One can also tell that Mario Rossi 61 owns a phone number 66, i.e., (555) 555-####, located at 2932 University Drive 64 where he lives. Phone number 66 is located at 1176 Floyd Avenue 65 and Giuseppe Bianchi 62 lives at 2932 University Drive 64.

Figure 3:
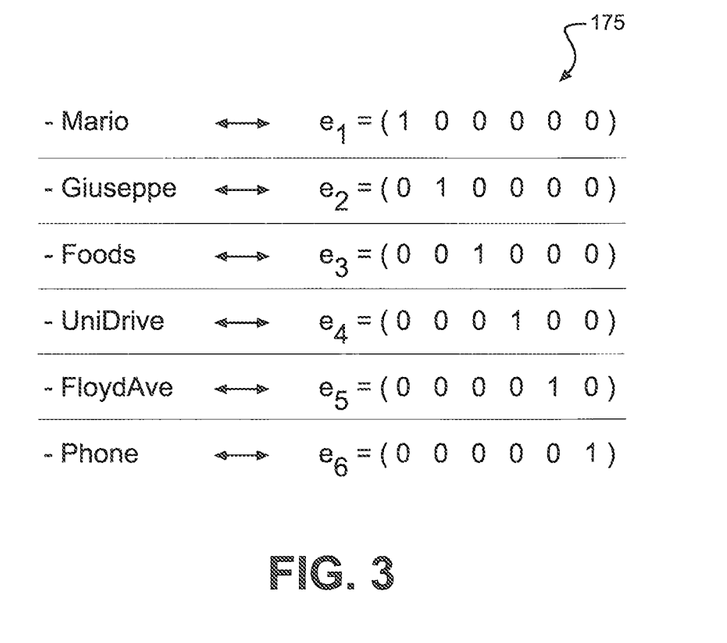
FIG. 3 shows a vector space $R^6$ with an vector associated with each entity.

Once the narrative has been organized, as shown in FIG. 2, in order to define mathematical operations on the data we associate a vector space X at step 100 to the knowledge base by means of a bijective map from the entities of the knowledge base onto the canonical basis of the vector space X as shown at 175 in FIG. 3. If a knowledge base contains n entities, the corresponding vector space will have dimension n.

Figure 4:
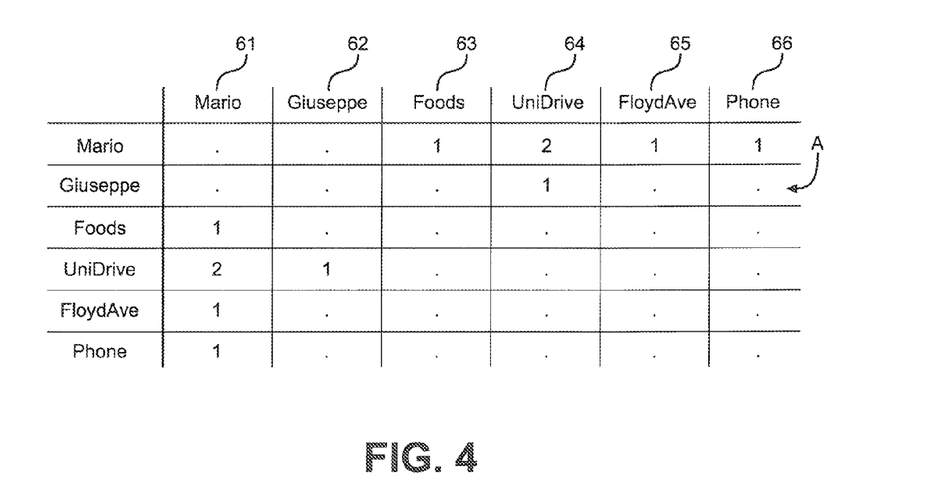
FIG. 4 shows an adjacency matrix A generated based on the knowledge base in FIG. 2.

An adjacency matrix is then formed, such as, adjacency matrix A shown in FIG. 4, capturing the "topology" of the relationships among entities. In adjacency matrix A, all entities 61-66 shown in FIG. 2 have been placed above the first row and before the first column. Where there is a connection between two entities a number, 1 if the matrix in un-weighted, or any number greater than 0 if the matrix is weighted, is entered in the appropriate location in adjacency matrix A. A single connection is shown as a 1 and multiple connections are shown with higher numbers. No connection is shown as a zero or no entry. For example, there are two connections between Mario 61 and 2932 University Drive 64, thus a "2" is placed in the adjacency matrix at 4,1 and 1,4. Semantic graph 52 shown in FIG. 2 can also be represented as simply six nodes with lines connected between them. An example of such an adjacency graph formed of nodes and lines is shown in FIG. 3, which will be discussed in more detail below. The links between nodes can also be rated, for example, the "2" provided in adjacency matrix A of FIG. 4, between Mario 61 and University Drive 64 indicates double the weight of the connection compared to the connection between Mario 61 and Select Gourmet Food 63.

Figure 5:
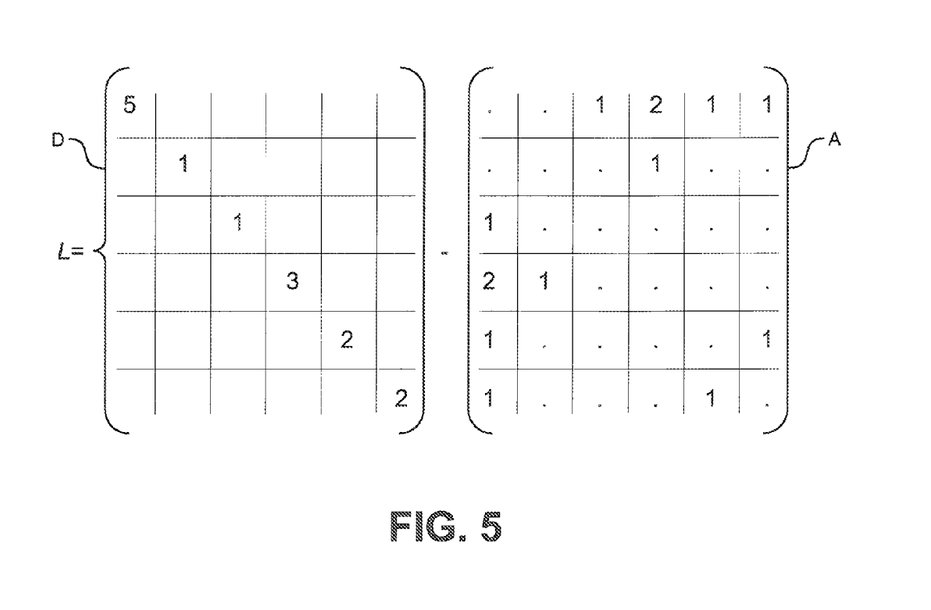
FIG. 5 shows and example of creating a Laplacian matrix L by subtracting the adjacency matrix A of FIG. 3 from a diagonal matrix D.

FIG. 5 shows a diagonal matrix D: X→X formed by adding all the values found in each row and placing the sum of the values along the diagonal. The connection between Mario and Foods, Unidrive×2, Floyd Ave and the phone add up to 5 so 5 is placed in the 1,1 position and so on. The Laplacian matrix L: X→X, L=D−A, is simply found by subtracting the adjacency matrix from the diagonal matrix at step 160. In mathematical terms the matrices are written as follows:

$$A_{ij} = A_{ji} = \begin{cases} w_{ij} > 0, & \text{node } i \text{ connected to node } j \\ 0, & \text{otherwise} \end{cases}$$

$$D_{ij} = \begin{cases} \sum_{k=1}^{n} A_{ik}, & i = j \\ 0, & \text{otherwise} \end{cases}$$

Matrix A is called the weighted adjacency matrix (the values $w_{ij}$ are positive weights measuring the "strength" of the relationship between connected nodes), and the diagonal matrix D is the degree matrix.

Several measures of connectedness between pairs of entities can be built from the pseudo-inverse of the Laplacian matrix at step 180. It is well known that the Laplacian matrix associated with a graph is singular, so either a "penalized" inverse or a pseudo-inverse are considered at step 180. The inverse of the penalized Laplacian is defined as $L(\rho)=D-\rho A$, where $0<\rho<1$ is the penalty factor, while the pseudo inverse considered is the Moore-Penrose pseudo inverse. The inverse of the Laplacian matrix is interpreted as the covariance matrix associated with the entities in the knowledge base and is used as a measure of connectedness. For the tensor scoring approach, a more preferred metric of connectedness or closeness is the conductance matrix C, defined at step 200 as $$C_{ij} = \begin{cases} 0, & i = j \\ (L'_{ii} + L'_{jj} - L'_{ij} - L'_{ji})^{-1}, & i \neq j \end{cases}$$

where L' indicates the Moore-Penrose pseudo inverse of the Laplacian matrix L.

By letting $X=R^6$ be the vector space associated with the knowledge base K at step 100 and indicating with $B=\{e_1, \ldots, e_6\}$ the canonical basis of $R^6$, a bijective map from K to X is realized by associating every entity of K with every element of B, namely Mario$\leftrightarrow e_1$
Giuseppe$\leftrightarrow e_2$
Gourmet Food$\leftrightarrow e_3$
UniDrive$\leftrightarrow e_4$
FloydAve$\leftrightarrow e_5$
Phone$\leftrightarrow e_6$ These elements may also be represented as vectors as shown at 175 in FIG. 3. Suppose that the event: "Mario or Giuseppe move from UniDrive to FloydAve" is to be analyzed in a tensor space at step 120. This linear representation preferably handles both AND logic between entities and OR logic. This can be realized by considering the tensor for example at step 140 as follows:
MoveEventSpace=Subject$\otimes$ LocationFrom
$\otimes$ LocationTo=R6$\otimes$ R6$\otimes$ R6 and representing the move event as $$(b_1 + b_2) \otimes b_4 \otimes b_5 \leftrightarrow \begin{array}{l} \text{Mario OR Giuseppe} \\ \text{AND} \\ \text{UniDrive} \\ \text{AND} \\ \text{FloydAve} \end{array}$$

Having represented the multiple role event as an element of a tensor space H, a bilinear operator is built q: H$\otimes$ H$\to$R which takes a pair of events x, y$\in$H and returns a non negative real number, the score at step 220. The operator q is preferably used in two ways:
1) To score an event x against itself, q(x,x), which can be interpreted as the "event variance", measuring the "self-energy" of the event induced by the semantic graph;
2) To score an event x against another event y, q(x,y), which can be interpreted as the "event covariance", measuring the "interaction energy" of two events induced by the semantic graph.

By requiring the function q to be linear in each of its two arguments, q is represented as a scalar product $$q(x,y)=(x,Ty)$$

where T: H$\to$H is a tensor linear operator refer to as the scoring operator. In the move event space defined above, T is a tensor with 6 indices (2 indices for each of the 3 roles), and the score for the move event is written as $$(x, Ty) = \sum_{i,j} x_i T_{ij} y_j$$

where $i=(i_1,i_2,i_3)$ and $j=(j_1,j_2,j_3)$ are multi indices, having as many components as many roles are in the event.

Let X be an n dimensional space over R with canonical basis $B=\{e_1, \ldots, e_6\}$, and let $$H = \underbrace{X \otimes X \otimes \ldots \otimes X}_{m \text{ times}}$$

be a tensor space of total order m (representing a space of events with m syntactical roles). An event x$\in$H can be thought as a multi array $$x = \sum_{i_1=1}^{n} \ldots \sum_{i_m=1}^{n} x_{i_1 \ldots i_m}(e_{i_1} \otimes \ldots \otimes e_{i_m})$$

The values $x_{i_1 \ldots i_m} \in R$ are the component of event tensor x associated with basis vector $e_{i_1 \ldots i_m} = e_{i_1} \otimes \ldots \otimes e_{i_m}$. A subset of $E \subset H$ that is of interest in the representation of events, is the set of tensor events x having the form $$x = x_1 \otimes \ldots \otimes x_m$$

where $x_j \in X$ for every $j=1, \ldots, m$. E is referred to as the space of pure events. Expanding each vector $x_j$ over the canonical basis that is $$x_j = x_{j1}e_1 + \ldots + x_{jn}e_n,$$

each component $x_{ij}$ is interpreted as the "compatibility" of entity i to participate to the event x in the role j. Each event $x \in E \subset H$ is univocally determined by the matrix of coefficient $x_{ij}$ where $j \in \{1, \ldots, m\}$ indicates the role and $i \in \{1, \ldots, n\}$ indicates the entity, via the factorization formula $$x = x_1 \otimes \ldots \otimes x_m = \left(\sum_{i=1}^{n} x_{1i} e_i\right) \otimes \ldots \otimes \left(\sum_{i=1}^{n} x_{mi} e_i\right)$$

The tensor scalar product $(x,y)_H$ between two tensors $x,y \in E$ is easily computed as $$(x, y)_H = (x_1, y_1)\ldots(x_m, y_m) = \prod_{j=1}^{m}\left(\sum_{i=1}^{n} x_{ji} y_{ij}\right)$$

requiring n×m operations. Notice that each $(x_j, y_j)$ is the usual Euclidean scalar product in the vector space X.

Figure 8:
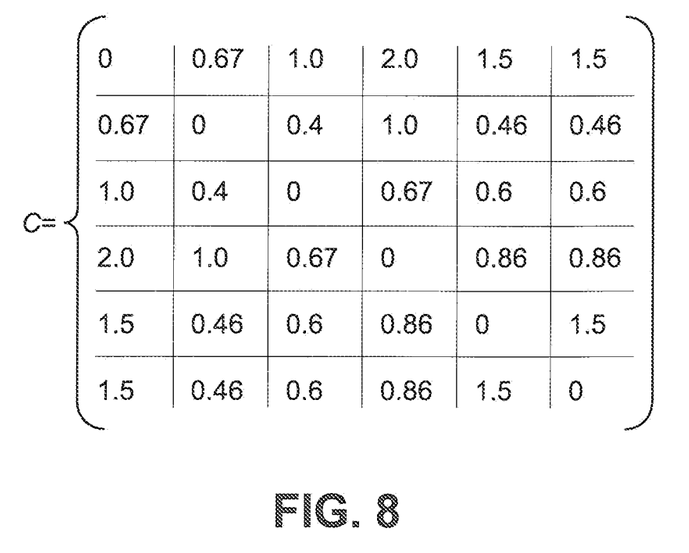
FIG. 8 shows a conductance matrix C.

A graph metric measuring the "connectedness" between pairs of entities is represented by a matrix M with non-negative entries. A preferable choice at step 200 is M=C, where C is the conductance matrix, shown in FIG. 8. Based on an m order event space $$H = \underbrace{X \otimes X \otimes \ldots \otimes X}_{m \text{ times}}$$

a simple class of scoring tensors at step 220

$T: H \to H$ can be defined by the action on the basis vectors $e_{i_1 \ldots i_m} := e_{i_1} \otimes \ldots \otimes e_{i_m}$ as $$(e_{i_1 \ldots i_m}, Te_{j_1 \ldots j_m})_H = (e_{i_1}, Me_{j_1}) \ldots (e_{i_m}, Me_{j_m}) \equiv M_{i_1 j_1} \ldots M_{i_m j_m}$$

By bi-linearity $$q(x, y) = (x, Ty)_H$$

$$= \sum_{i_1=1}^{n} \ldots \sum_{i_1=1}^{n} \sum_{j_1=1}^{n} \ldots \sum_{j_m=1}^{n} x_{i_1 \ldots i_m} y_{j_1 \ldots j_m} q(e_{i_1 \ldots i_m}, e_{j_1 \ldots j_m})$$

$$= \sum_{i_1=1}^{n} \ldots \sum_{i_1=1}^{n} \sum_{j_1=1}^{n} \ldots \sum_{j_m=1}^{n} x_{i_1 \ldots i_m} y_{j_1 \ldots j_m} M_{i_1 j_1} M_{i_2 j_2} \ldots M_{i_m j_m}$$

This formula simplifies if the tensors x,y belong to the space of pure events $E \subset H$. In this case $x = x_1 \otimes \ldots \otimes x_m$, $y = y_1 \otimes \ldots \otimes y_m$, and we have $$q(x, y) = \prod_{j=1}^{m}(x_j, My_j) = \prod_{j=1}^{m}\left(\sum_{i=1}^{n}\sum_{k=1}^{n} x_{j,i} M_{ik} y_{j,k}\right)$$

Consider now a non-negative pure event $w \in E$ $$w = \left(\sum_{i=1}^{n} w_{1i} e_i\right) \otimes \ldots \otimes \left(\sum_{i=1}^{n} w_{mi} e_i\right)$$

The event class of w is defined as the pure event $k \in K$ defined by $$\kappa = \kappa_1 \otimes \ldots \otimes \kappa_m = \left(\sum_{i=1}^{n} I(w_{1i} \neq 0) e_i\right) \otimes \ldots \otimes \left(\sum_{i=1}^{n} I(w_{mi} \neq 0) e_i\right)$$

Let $\circ: H \otimes H \to H$ indicate the Hadamard product defined by $(x \circ y)_{i_1 \ldots i_m} = x_{i_1 \ldots i_m} y_{i_1 \ldots i_m}$ For each tensor basis event $b = e_{i_1} \otimes \ldots \otimes e_{i_m}$ such that $b \circ k = b$, we say that b belongs to the class k, and we define the score of b relative to the event class k with compatibility w as $$[b|\kappa; w] = \frac{(w \circ b, s_\kappa)_H}{(w \circ \kappa, s_\kappa)_H}$$

(notice that $w \circ K = w$ by definition of K) where the scoring tensor $s_k$ is defined by $s_k = M(k_1 + \ldots + k_m) \otimes \ldots \otimes M(k_1 + \ldots + k_m)$ Notice that the scoring tensor $s_k$ is of the form $s_k = v \otimes \ldots \otimes v$, where $v = M(k_1 + \ldots + k_m)$ is a vector. By definition the score of the entire class K is equal to 1, so that $$[\kappa|\kappa; w] = \frac{(w \circ \kappa, s_\kappa)_H}{(w \circ \kappa, s_\kappa)_H} = 1$$

Since by hypothesis M has non-negative entries, then for every base event b belonging to the class k (that is, for every base event b such that $b \circ k = b$) yields $0 \leq [b|k; w] \leq [k|k; w] = 1$.

Figure 6:
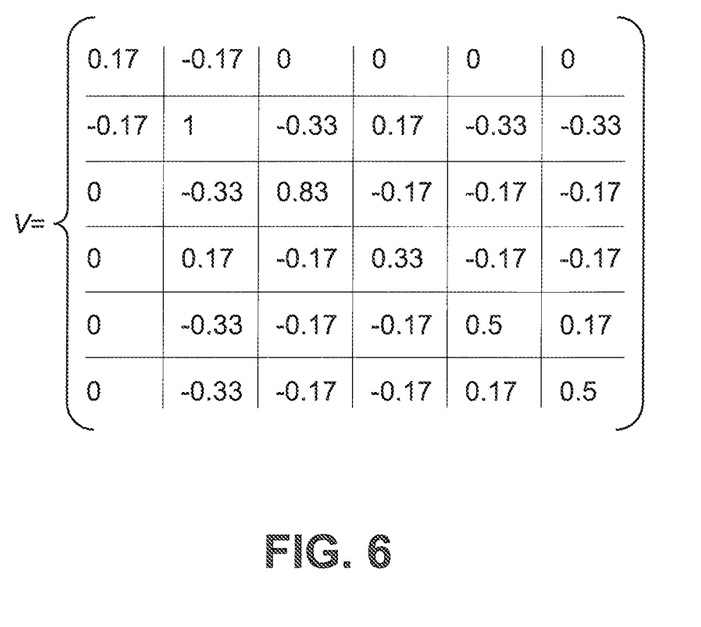
FIG. 6 shows a covariance matrix V.
Figure 7:
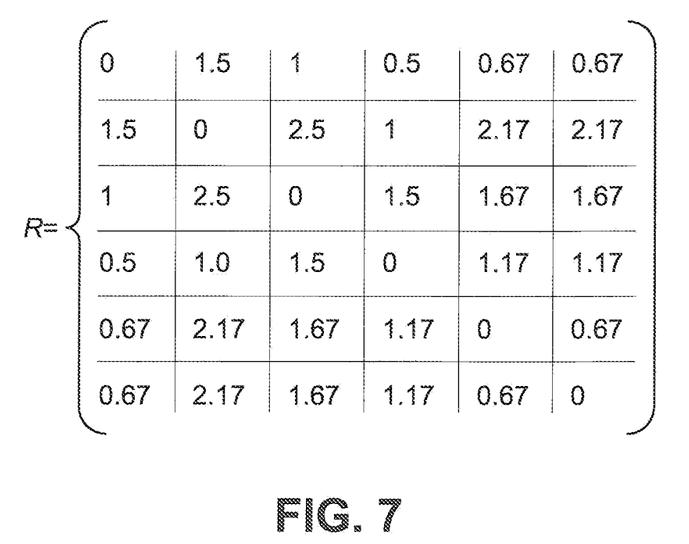
FIG. 7 shows a Resistance matrix R.

Considering that the score [b|k; w] is linear in b, we may interpret [b|k; w] as the "probability" of a base event b to occur, relative to the event class k with compatibility w, An example of using these techniques is based on the knowledge base shown in FIG. 2. As described above with reference to FIGS. 4 and 5, an adjacency matrix A may be created and, from the equation L=D–A, the Laplacian matrix is calculated. From that point the pseudo-inverse of the Laplacian matrix V=L' is calculate at step 180 as shown in FIG. 6. A resistance matrix $R_{ij}$ is defined as $R_{ij} = V_{ii} + V_{jj} - V_{ij} - V_{ji}$ and is shown in FIG. 7. A conductance matrix, where $C_{ij} = 1/R_{ij}$ if i is not equal to j and 0 otherwise, is calculated at step 200 and shown in FIG. 8. Preferably the conductance matrix is used to score events in a hypothetical scenario.

Figure 9:
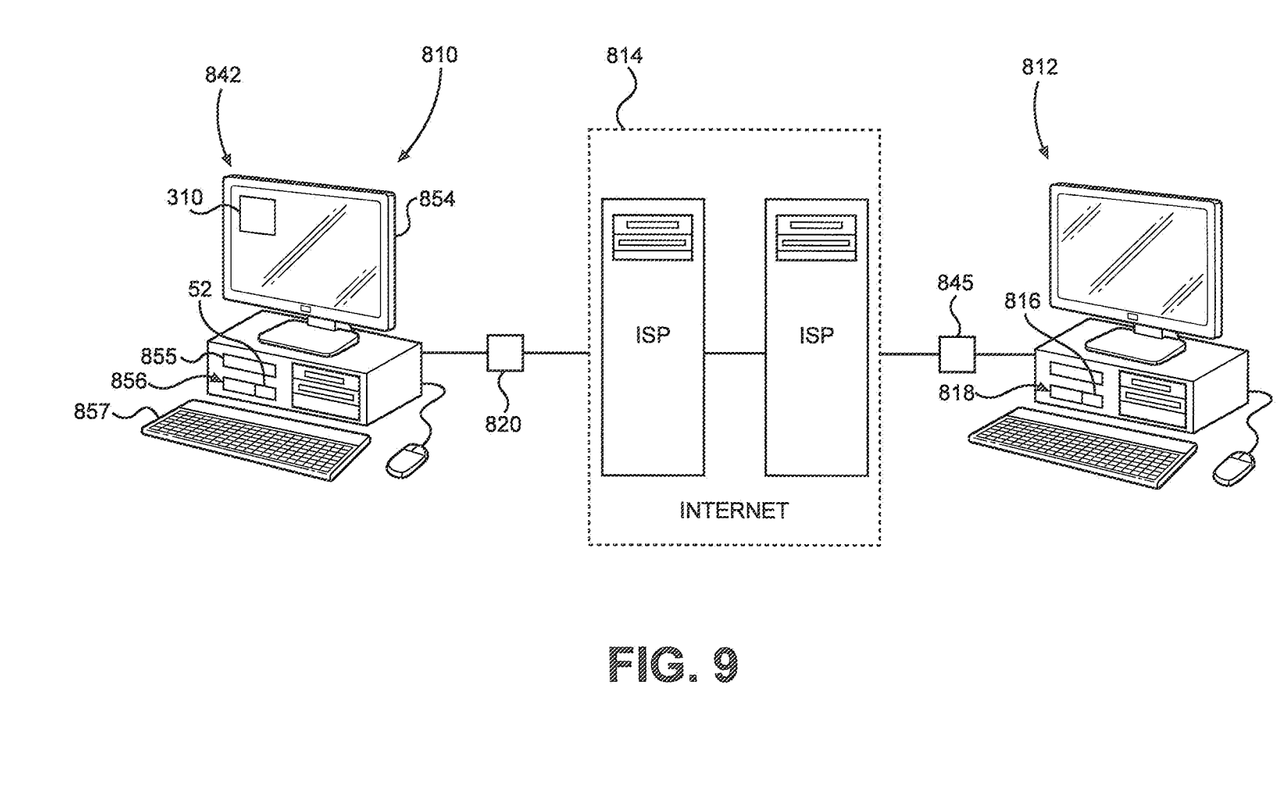
FIG. 9 is a diagram of a system with computers connected to the internet for implementing the method of FIG. 1.

As shown in FIG. 9, a system for implementing the method shown in FIG. 1 in accordance with a preferred embodiment of the present invention includes an analyst's computer system 810 which can be connected to one or more other computer systems 812 over an electronic communications link, such as the internet 814. As illustrated in FIG. 9, analyst's computer system 810 includes an input-output unit 820 for transmitting and receiving digital information to or from internet 814. Likewise, each computer system 812 is also set up to contact the internet 814 through an input-output unit 845 and preferably hosts websites 816 in a memory 818. Computer 810 typically has a monitor 854, a central processing unit 855, some type of memory 856 and a keyboard 857. Typically, when in use, analyst's computer 842 utilizes an operating system, such as Macintosh®, Unix® or Windows® which controls the basic operations of the computing machine. Additionally, specialized applications, such as a web browser, would be used to interpret the various protocols of internet 814 into an understandable interface for a computer user, namely the analyst. The knowledge base is preferably stored in memory 856. Various specific pieces of software used to complete the method steps of algorithm 10 shown in FIG. 1 reside in memory 856, Based on the above, it should be readily apparent the method of the present invention provides an efficient way for an analyst to score events in a knowledge base and determine the likelihood of these events occurring. Although described with reference to preferred embodiments of the invention, it should be readily understood that various changes and/or modifications can be made to the invention without departing from the spirit thereof. For instance, while Allen's algebra rules are noted as a way to indicate time relationships between events, other known ways of noting time relationships could be used. In general, the invention is only intended to he limited by the scope of the following claims.

The invention claimed is:

1. A computer implemented method for scoring a relative likelihood that a hypothetical event in a scenario is to occur, the method comprising:
   collecting narrative text communications, each communication including a group of words, regarding evidence related to the scenario to build a knowledge base;
   representing the evidence as a semantic graph of the knowledge base;
   building a symmetric weighted adjacency matrix representing an undirected weighted topology of the semantic graph;
   building a tensor space to represent events or classes of events of the scenario;
   building a tensor operator, from the symmetric weighted adjacency matrix, measuring a connectedness or closeness of entities in the scenario into the hypothetical event; and
   scoring each event or classes of events by using the tensor operator to rank the relative likelihood of each event to occur relative to a class of events.

2. The method according to claim 1, wherein scoring events includes defining a score as a tensor scalar product between two tensors representing events or classes of events.

3. The method according to claim 1 further comprising organizing the evidence contained in the narrative text into a knowledge base as one or more triples with each triple including a subject, a relation and an object, according to a given ontology.

4. A computer implemented method for scoring a relative likelihood that a hypothetical event in a scenario is to occur, the method comprising:
   collecting narrative text communications, each communication including a group of words, regarding evidence related to the scenario;
   building a tensor space to represent events or classes of events of the scenario;
   developing an adjacency matrix $A_{ij}$;
   calculating a Laplacian matrix $L_{ij}$ of the adjacency matrix;
   calculate a pseudo-inverse $V_{ij}$ of the Laplacian matrix;
   calculate a resistance matrix $R_{ij}=V_{ii}+V_{ij}-V_{ij}-V_{ji}$;
   calculate a conductance matrix $C_{ij}=1/R_{ij}$ if i is not equal to j and 0 otherwise;
   using the conductance matrix to build a tensor operator measuring a connectedness or closeness of entities in the scenario into the hypothetical event; and
   scoring each event or classes of events by using the tensor operator to rank the relative likelihood of each event to occur relative to a class of events given the evidence contained in the knowledge base.

5. The method according to claim 3 further comprising associating a vector space to the knowledge base by associating each entity with a basis vector, an entity being either a subject or an object in one of the one or more triples in the knowledge base.

6. A computer implemented method for scoring a relative likelihood that a hypothetical event in a scenario is to occur, the method comprising:
   collecting narrative text communications, each communication including a group of words, regarding evidence related to the scenario;
   organizing the evidence contained in the narrative text into a knowledge base as one or more triples with each triple including a subject, a relation and an object, according to a given ontology;
   representing one of the one or more triples in the knowledge base in a semantic graph and building a symmetric weighted adjacency matrix representing an undirected topology of the semantic graph;
   building a tensor space to represent events or classes of events of the scenario;
   building a tensor operator measuring a connectedness or closeness of entities in the scenario into the hypothetical event;
   associating a vector space to the knowledge base by associating each entity with a basis vector, an entity being either a subject or an object in one of the one or more triples in the knowledge base; and
   scoring each event or classes of events by using the tensor operator to rank the relative likelihood of each event to occur relative to a class of events and defining a score as a tensor scalar product between two tensors representing events or classes of events.

7. The method according to claim 6 further comprising using the adjacency matrix as a linear operator onto the vector space associated with the knowledge base.

8. The method according to claim 7 further comprising building a Laplacian matrix associated with the adjacency matrix and taking a pseudo-inverse of the Laplacian matrix.

9. The method according to claim 8 further comprising using the pseudo-inverse of the Laplacian matrix to build graph-metrics measuring the connectedness or closeness between the entities in the knowledge base.

10. The method according to claim 9 wherein building a tensor operator measuring the connectedness or closeness of entities in the scenario into the hypothetical event includes using a metric obtained from the pseudo inverse of the Laplacian.

11. The method according to claim 10 further comprising developing a syntactical model.

12. The method according to claim 11 wherein developing the syntactical model includes representing the events of a hypothetical scenario as independent clauses, each of which has only one verb, and represents an event including sets of entities.

13. The method according to claim 12 wherein the entity is performing an action.

14. The method according to claim 12 wherein the entity is a source of an action.

15. The method according to claim 12 wherein the entity is a destination of the action.

16. The method according to claim 12 wherein the entity is an object of an action.

17. The method according to claim 12 wherein the entity is an instrument used to carry out an action.

18. The method according to claim 12 wherein the entity provides spatial and temporal information, about an action.

* * * * *